(12) United States Patent
Rue et al.

(10) Patent No.: US 7,573,846 B2
(45) Date of Patent: Aug. 11, 2009

(54) METHOD AND SYSTEM FOR SUPPORTING MOBILITY OF MOBILE TERMINAL

(75) Inventors: Seon-Soo Rue, Suwon-si (KR); Gui-Jung Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1076 days.

(21) Appl. No.: 10/964,738

(22) Filed: Oct. 15, 2004

(65) Prior Publication Data
US 2005/0089010 A1      Apr. 28, 2005

(30) Foreign Application Priority Data
Oct. 27, 2003    (KR)    ..................... 10-2003-0075268

(51) Int. Cl.
*H04Q 7/00*    (2006.01)
(52) U.S. Cl. .................. 370/329; 370/332; 370/328; 370/331; 370/352; 370/232; 370/349; 370/342; 455/434; 455/442; 455/436; 455/435.1
(58) Field of Classification Search ................. 370/328, 370/338, 329, 331, 389, 255, 349, 312, 402, 370/401, 332, 352, 342; 455/433; 709/227, 709/229
See application file for complete search history.

(56) References Cited

U.S. PATENT DOCUMENTS

| | | | |
|---|---|---|---|
| 5,970,059 A * | 10/1999 | Ahopelto et al. ............. | 370/338 |
| 6,147,986 A | 11/2000 | Orsic | |
| 6,160,804 A * | 12/2000 | Ahmed et al. ................ | 370/349 |
| 6,195,705 B1 * | 2/2001 | Leung ......................... | 709/245 |
| 6,332,077 B1 | 12/2001 | Wu et al. | |
| 6,374,108 B1 | 4/2002 | Jakobsen et al. | |
| 6,404,754 B1 | 6/2002 | Lim | |
| 6,487,406 B1 * | 11/2002 | Chang et al. ............. | 455/422.1 |
| 6,490,259 B1 | 12/2002 | Agrawal et al. | |

(Continued)

FOREIGN PATENT DOCUMENTS

CA    2 310 783    12/2000

(Continued)

OTHER PUBLICATIONS

Australian Office Action of the Australian Patent Application No. 2004-214584, issued on Oct. 13, 2005.

(Continued)

*Primary Examiner*—Marceau Milord
(74) *Attorney, Agent, or Firm*—Robert E. Bushnell, Esq.

(57) ABSTRACT

A method and system for supporting mobility of a mobile node in which, when it is recognized that the mobile node has moved into a foreign sub-network, the mobile node is allocated, by its home sub-network, a new Internet protocol address suitable for a prefix of the foreign sub-network after movement when moving out of an area of the home sub-network into the foreign sub-network so that route optimization is implemented. Since direct communication is made between a mobile node and a correspondent node without passing a network where the mobile node existed before movement, it is possible to implement the route optimization. There is no generation of packet overhead since Internet protocol tunneling technology is not applied upon routing.

32 Claims, 6 Drawing Sheets

U.S. PATENT DOCUMENTS

| | | | |
|---|---|---|---|
| 6,614,774 B1 * | 9/2003 | Wang | 370/338 |
| 6,628,943 B1 * | 9/2003 | Agrawal et al. | 455/432.1 |
| 6,671,735 B1 * | 12/2003 | Bender | 709/238 |
| 6,757,266 B1 * | 6/2004 | Hundscheidt | 370/328 |
| 6,768,726 B2 | 7/2004 | Dorenbosch et al. | |
| 6,771,635 B1 * | 8/2004 | Vilander et al. | 370/349 |
| 6,845,091 B2 * | 1/2005 | Ogier et al. | 370/338 |
| 6,954,790 B2 * | 10/2005 | Forslow | 709/227 |
| 6,959,009 B2 * | 10/2005 | Asokan et al. | 370/475 |
| 6,965,584 B2 * | 11/2005 | Agrawal et al. | 370/331 |
| 6,970,443 B2 * | 11/2005 | Dynarski et al. | 370/338 |
| 7,061,887 B2 * | 6/2006 | Fan | 370/331 |
| 7,120,136 B2 * | 10/2006 | Upp et al. | 370/331 |
| 7,130,629 B1 * | 10/2006 | Leung et al. | 455/435.1 |
| 7,149,521 B2 * | 12/2006 | Sundar et al. | 455/435.1 |
| 7,158,497 B2 * | 1/2007 | Li et al. | 370/331 |
| 7,193,980 B2 * | 3/2007 | Wenzel et al. | 370/329 |
| 7,257,105 B2 * | 8/2007 | Molteni et al. | 370/338 |
| 7,293,107 B1 * | 11/2007 | Hanson et al. | 709/245 |
| 7,313,628 B2 * | 12/2007 | Chaskar et al. | 709/238 |
| 7,319,886 B2 * | 1/2008 | Tokoro | 455/552.1 |
| 7,340,262 B1 * | 3/2008 | Gillespie et al. | 455/456.3 |
| 7,353,027 B2 * | 4/2008 | Karagiannis et al. | 455/436 |
| 7,433,691 B1 * | 10/2008 | White | 455/445 |
| 2003/0045287 A1 | 3/2003 | Taniguchi | |
| 2004/0066757 A1 * | 4/2004 | Molteni et al. | 370/329 |

FOREIGN PATENT DOCUMENTS

| | | |
|---|---|---|
| JP | 11-298950 | 10/1999 |
| JP | 2000-156682 | 6/2000 |
| JP | 2001-144844 | 5/2001 |
| JP | 2001-274816 | 10/2001 |
| JP | 2001-326696 | 11/2001 |
| JP | 2003-304255 | 10/2003 |
| WO | WO 01/31472 | 5/2001 |
| WO | WO 03/065152 | 8/2003 |

OTHER PUBLICATIONS

European Office Action of the European Patent Application No. 04 02 5569 issued on Jan. 2, 2006.

An article "Using DHCP with computers that move" written by Perkins et al., published in Wireless Networks, vol. 1, pp. 341-353 on Oct. 1, 1995.

An article "Accelerating Mobile IP hand-offs through Link-layer Information, An Experimental Investigation with 802.11b and Internet Audio" written by Fikouras et al., published in Proceedings 11th GI/ITG Conference on Measuring, on Sep. 14, 2001.

An article "Fast Handovers for Mobile IPv6" published in Internet Engineering Task Force, vol. 1 on Oct. 10, 2003.

An article "Parameters for Link Hints" published in Internet Engineering Task Force, on Aug. 2003.

Japanese Office action corresponding to Japanese Patent Application No. 2004-311652, issued on May 8, 2007.

Japanese Office Action of the Japanese Patent Application No. 2004-311652, issued on Jul. 18, 2006.

* cited by examiner

METHOD AND SYSTEM FOR SUPPORTING MOBILITY OF MOBILE TERMINAL

CLAIM OF PRIORITY

This application makes reference to, incorporates the same herein, and claims all benefits accruing under 35 U.S.C. 19 from an application for METHOD AND SYSTEM FOR SUPPORTING MOBILITY TERMINAL earlier filed in the Korean Intellectual Property Office on 27 Oct. 2003 and there duly assigned Serial No. 2003-75268.

BACKGROUND OF THE INVENTION

1. Field of the Invention

The present invention generally relates to a method for supporting mobility of a terminal in a wireless private branch exchange. More particularly, the present invention relates to a method and system for supporting mobility of a mobile terminal in which the mobile terminal is allocated a new IP address suitable for a prefix of a sub-network after movement when moving out of an area of one sub-network into a new sub-network so that route optimization is implemented.

2. Description of the Related Art

Generally, widely used information terminals, such as a personal computer, a notebook computer, a PDA (Personal Digital Assistant) terminal, and the like, build a network called LAN (Local Area Network) to share information between them. The network can be classified into a wired LAN that is built by directly connecting information terminals using a communication cable, and a wireless LAN using access points.

In a wireless local area network (WLAN), data transmission and reception, namely, communication, is performed using radio wave or light, resulting in easy expansion and maintenance as well as free movement.

Meanwhile, by virtue of rapid development of Voice Over Internet Protocol (VoIP) technology in which transmission and reception of voice and data is performed over an IP network, an IP based communication network is substituted for a voice communication network in an enterprise and between branch offices of the enterprise. By building the voice communication network on an IP basis, it has advantages that cost consumed to build a network is saved, maintenance of the network is easily made and any other additional services can be easily built.

An IP-PBX, by which IP based networks are substituted for all existing Private Branch Exchanges (PBXs) based in-plant telephone networks, is an example in which such voice and data integration technology is applied to an in-plant telephone system. If the IP-PBX is used, IP-Phones supporting a VoIP function are substituted for all in-plant telephones, and a VoIP gateway is disposed at an interface between an enterprise and an external public switched telephone network (PSTN) to relay a transmitted and received call to the external PSTN. Further, an international telephone call or a long-distance telephone call between a head office and a branch office is linked via an external Internet, thereby saving communication cost.

However, the IP-PBX system may be advantageous in aspects of installation and maintenance of an in-plant telephone network and communication cost, but it does not provide any other conveniences for users, as compared to an existing PBX in-plant telephone system based on a circuit switching system.

Thus, a combination of wireless LAN technology and IP-PBX technology yields a system in which an IP based communication network is internally built and a public network is used at the exterior.

The increasing variety of wireless devices offering IP connectivity, such as PDAs, handhelds, and digital cellular phones, is beginning to change how the Internet is used and how these wireless devices access the Internet.

These wireless devices are convenient due to there mobility, thus it has become increasingly desired to be able to access the Internet from an area away from one's home network. Accordingly, mobile IP technology has been developed to solve this problem The following references discussing mobile IP are incorporated by reference herein:

U.S. Pat. No. 6,147,986 to Milo Orsic and entitled "Address Updating Of Wireless Mobile Terminal Hosts Affiliated With A Wired Network" discusses assigning an address to a mobile node affiliated with a wired communications network, the address corresponding in part to a first network base station with which the mobile node becomes linked, changing the address assigned to the mobile node when the mobile node becomes linked with a second network base station, the changed address corresponding in part to an address of the second base station, and informing at least one stationary terminal host in the network of a current address assigned to the mobile node by establishing a connection between the mobile node and the stationary terminal host;

U.S. Pat. No. 6,332,077 to Chi-Kai Wu et al. and entitled "Intelligent Roaming In AGV Application" discusses a roaming algorithm for associating a mobile node with an access point (AP) in a wireless LAN system used in an automatic guidance vehicle (AGV) application. Fast roaming is achieved by eliminating a mobile node's scanning time during the search of the next AP to associate with. To eliminate the scanning time, each AP is pre-configured with its adjacent APs in advance. Whenever an AP is associated with a mobile node, the mobile node gets the information of neighboring APs from the currently associated AP. Then, the mobile node continuously monitors the signal strength of APs in its neighborhood. During roaming, the mobile node chooses the best AP to associate with without having to scan all the Aps;

U.S. Pat. No. 6,374,108 to Ken Jakobsen et al. and entitled "Assigning An IP Address To A Mobile Station While Roaming" discusses assigning a new IP address to a mobile node when the mobile node moves into a new cell (sub-network);

U.S. Pat. No. 6,490,259 to Prathima Agrawai et al. and entitled "Active Link Layer And Intra-Domain Mobility For IP Networks" discusses the use of active packets are utilized by a mobile node in a wireless network to manage the micro-mobility which includes both link layer mobility and intra-domain mobility of a wireless connection as the mobile node moves from one cell (sub-network) to another in a domain of a network. Active packets convey instructions and data so nodes in the domain may update forwarding tables maintained by each of the devices in the domain. The forwarding table entries contain both link layer entries and network layer entries to efficiently handle roaming by the mobile node. Also discussed is the assigning of a new IP address by a foreign agent (router) or dynamic host configuration protocol (DHCP) server; and U.S. Pat. No. 6,768,726 to Jheroen P. Dorenbosch et al. and entitled "Method And Apparatus For Effecting A Seamless Handoff Between IP Connections" discusses a method and apparatus for effecting a handoff from a first Internet Protocol (IP) connection to a second IP connection using the first IP connection and a first IP address for the first station, the gateway relaying the packet data communication with a second station; setting up the second IP connection with a second IP address for the first station, the first IP connection being a primary connection and the second IP connection being a secondary connection between the first station and the gateway, the first and the second IP connection existing concurrently; determining that the second IP connection should be the primary connection between the first station and the gateway; and changing the second IP connection to the primary connection by informing the gateway that the second IP address is the primary address using stream control transmission protocol (SCTP) messages, wherein the packet data communication is immediately switched over to the second IP connection.

SUMMARY OF THE INVENTION

It is an objective of the present invention to provide a method and system for supporting mobility of a mobile node in which a new IP address suitable for a relevant network prefix is accorded to a wireless LAN terminal after the mobile node moves so that direct data transmission and reception is made between a correspondent node and a destination node, thereby implementing route optimization without using tunneling technology that causes an overhead.

According to one aspect of the present invention, there is provided a method of supporting mobility of a mobile node using a mobile Internet protocol (IP), comprising: recognizing that the mobile node moves into another sub-network; and when it is recognized that the mobile node has moved into another sub-network, allocating an IP address to the mobile node, the IP address having the same network prefix as that for the sub-network into which the mobile node has moved.

Recognizing the movement of the mobile node includes: performing, by the mobile node, an active scan to discover neighboring networks; determining an identifier of an access point that is determined to have high received electric field intensity through the active scan; determining whether the identifier of the access point that is determined to have the high received electric field intensity is identical to that of a previous access point to determine whether the another sub-net is identical to a previous sub-network or not; when the identifiers of the access points are different from each other, determining that the another sub-net is a different sub-network; and when the identifiers of the access points are identical to each other, determining that the another sub-net is the same sub-network.

The identifiers of the access points are extended service set identifications (ESSIDs) representing identifiers of the sub-networks, and when the access points belong to the same sub-network, the ESSIDs are the same.

The active scan is performed when a level of received electric field intensity is lowered by a certain value upon movement of the mobile node. The active scan is periodically performed to confirm whether there are neighboring access points using any identifier.

The mobile node manages registered access point identifiers of the access point identifiers obtained by the active scan. The mobile node is connected to an access point having the greatest received electric field intensity level value among access points having a registered identifier.

Upon transmitting the dynamic host configuration protocol (DHCP) request frame to the DHCP server, the mobile node transmits the frame including a user identifier and password, authentication information, or the like in an option field of the frame.

The access point performs a DHCP relay function with a predefined DHCP server, and transmits information obtained from the mobile node and access point media access control (MAC) address information included in an option field to the DHCP server.

The DHCP server allocates an IP address of the mobile node using the received mobile node information and access point information, and transmits the newly allocated IP address to the access point.

The DHCP server transmits mobile node information to a home network managing an overall system.

Further, the method further includes: when there is a correspondent mobile node in communication with the mobile node that has moved into the another sub-network, directly routing a data packet to the sub-network into which the moving mobile node has moved by transmitting new IP address information of the moving mobile node to the correspondent mobile node.

According to another aspect of the present invention, there is provided a system for supporting mobility of mobile terminals in a system composed of a plurality of mobile terminals, a plurality of access points, and a home network, wherein the access points in the same sub-network are configured to have the same identifiers, and the home network performs call management of an overall system, mobility sensing, initial registration of mobile nodes, statistics, database management, and allocation of a new IP address to moving mobile terminals.

According to still another aspect of the present invention, there is provided a system for supporting mobility of mobile terminals in a system composed of a plurality of mobile terminals, a plurality of access points, and a home network, comprising a dynamic host configuration protocol (DHCP) server, the server performing call management of an overall system, mobility sensing, initial registration of mobile nodes, statistics, database management, and allocation of a new IP address to moving mobile terminals.

The home network notifies the access point, where the moving mobile node was previously positioned, of the IP address change of the mobile node.

The access point, where the moving mobile node was previously positioned, retransmits authentication information of the moving mobile node and data packets received during the movement to the new destination IP address.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawings so that those skilled in the art can easily implement the present invention.

First, definitions of terms used herein are as follows:

A Mobile Node (MN) means a host (mobile terminal) having mobility between networks, or a node (host) that, as part of normal use, changes its point of attachment to the Internet.

A Home Network (HN) manages the position of a mobile node and manages an overall system, and is the network at which the mobile node seems reachable, to the rest of the Internet, by virtue of its assigned IP address.

A Foreign Network (FN) supports an Internet connection for a mobile node, and is the network to which the mobile node is attached when it is not attached to its home network.

A Correspondent Node (CN) refers to a correspondent node communicating with a mobile node.

Extended Service Set Identification (ESSID): ESSIDs of access points (APs) belonging to the same network are the same. That is, if the ESSIDs of the APs are the same, it is determined that the APs belong to the same network. The network is composed of several Base Service Sets (BSSs (i.e., sub-networks)) connected by a distribution system.

Received Signal Strength Indication (RSSI) is received electric field intensity, namely, a level value indicating wireless reception intensity between a mobile node and an access point (AP).

Figure 1:
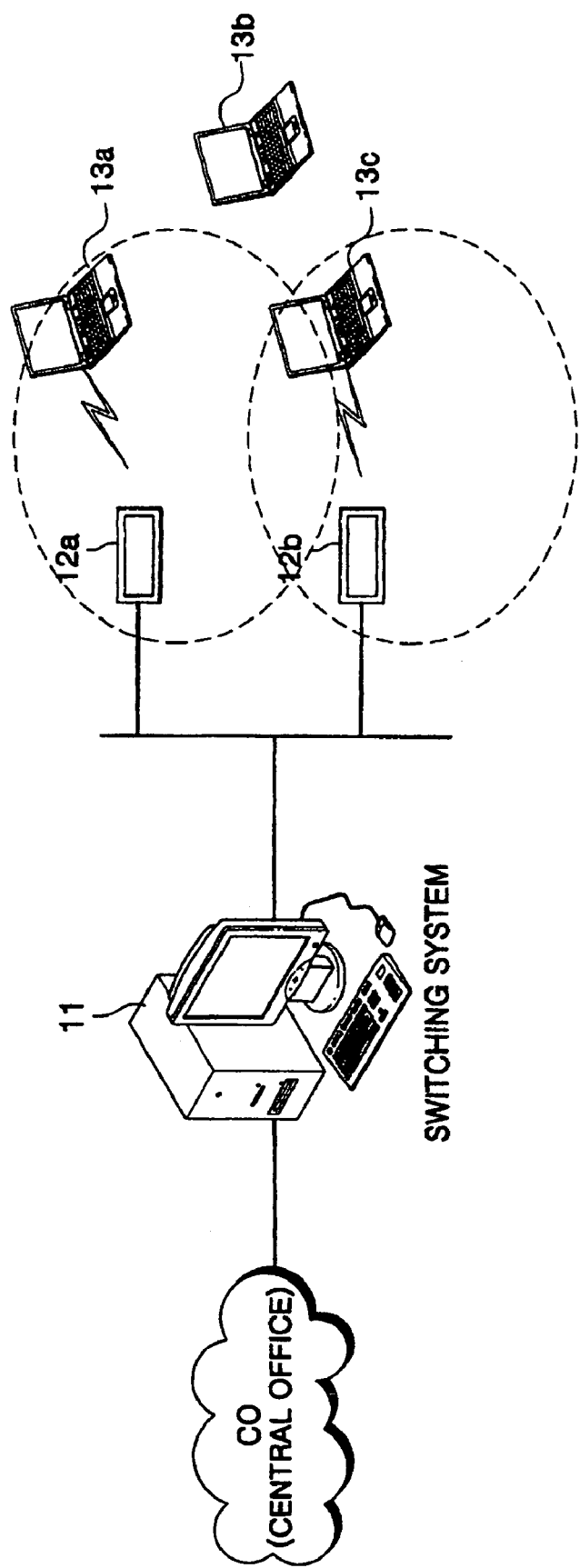
FIG. 1 is a schematic diagram showing a wireless LAN environment using an Ethernet between an exchange system and an access point.

FIG. 1 is a schematic diagram showing a wireless LAN environment using an Ethernet between an exchange system and an access point.

Referring to FIG. 1, the wireless LAN system includes an exchange (switching) system 11 physically connected to public network (central office) and IP network lines to allow an inter-converted signal to be transmitted to each line; mobile (terminals) nodes 13a, 13b and 13c each having a wireless LAN card mounted thereon so that wireless LAN users can use the mobile nodes; and access points 12a and 12b for transmitting a VoIP call connection request from the mobile nodes 13a, 13b and 13c to the exchange system 11 via an Ethernet shared line and transmitting a VoIP call from the exchange system 11 to the mobile nodes 13a, 13b and 13c.

The access points 12a and 12b and the exchange system 11 are interconnected via the Ethernet shared line.

The exchange system 11 performs a function of translating a VoIP call connection request from the mobile nodes 13a, 13b and 13c into a signal suitable for the public network, and converts a signal from the public network to a VoIP call to transmit the call to the mobile nodes 13a, 13b and 13c.

Thus, when a call is attempted from an enterprise (i.e., a terminal or telephone connected to the central office), the public network where quality of a call is excellent is used, while when a call is attempted into the enterprise, the IP network where cost is not charged is used.

In the thus built network, there is no change in a final destination IP address to which the IP packet is directed even when movement occurs between access points in the same sub-network if the same destination IP address in an IP frame is maintained. Thus, a data packet is normally transmitted.

However, there is a problem in that if a mobile node moves into a sub-network having a network prefix different from that of the IP address allocated to the mobile node, the data packet in a network router is not passed to the sub-network to which the mobile node belongs.

Currently, IP tunneling technology is being used to transmit a packet to sub-networks having a different network prefix. The IP tunneling technology is largely classified into three technologies of IP-in-IP, Minimal, and Generic Routing Encapsulation (see Network Working Groups Request for Comments (RFC) 1234: "Tunneling IPX Traffic through IP Networks", June 1991; RFC1241: "A Scheme for an Internet Encapsulation Protocol: Version 1", July 1991; RFC 1701: "Generic Routing Encapsulation (GRE)", RFC 1701, October 1994; RFC 1702: "Generic Routing Encapsulation over IPv4 networks" October 1994; RFC2003: "IP Encapsulation within IP", October 1996; and RFC2004: "Minimal Encapsulation within IP", October 1996).

Among them, an IP datagram upon IP tunneling by the IP-in-IP technology will be discussed.

Figure 2:
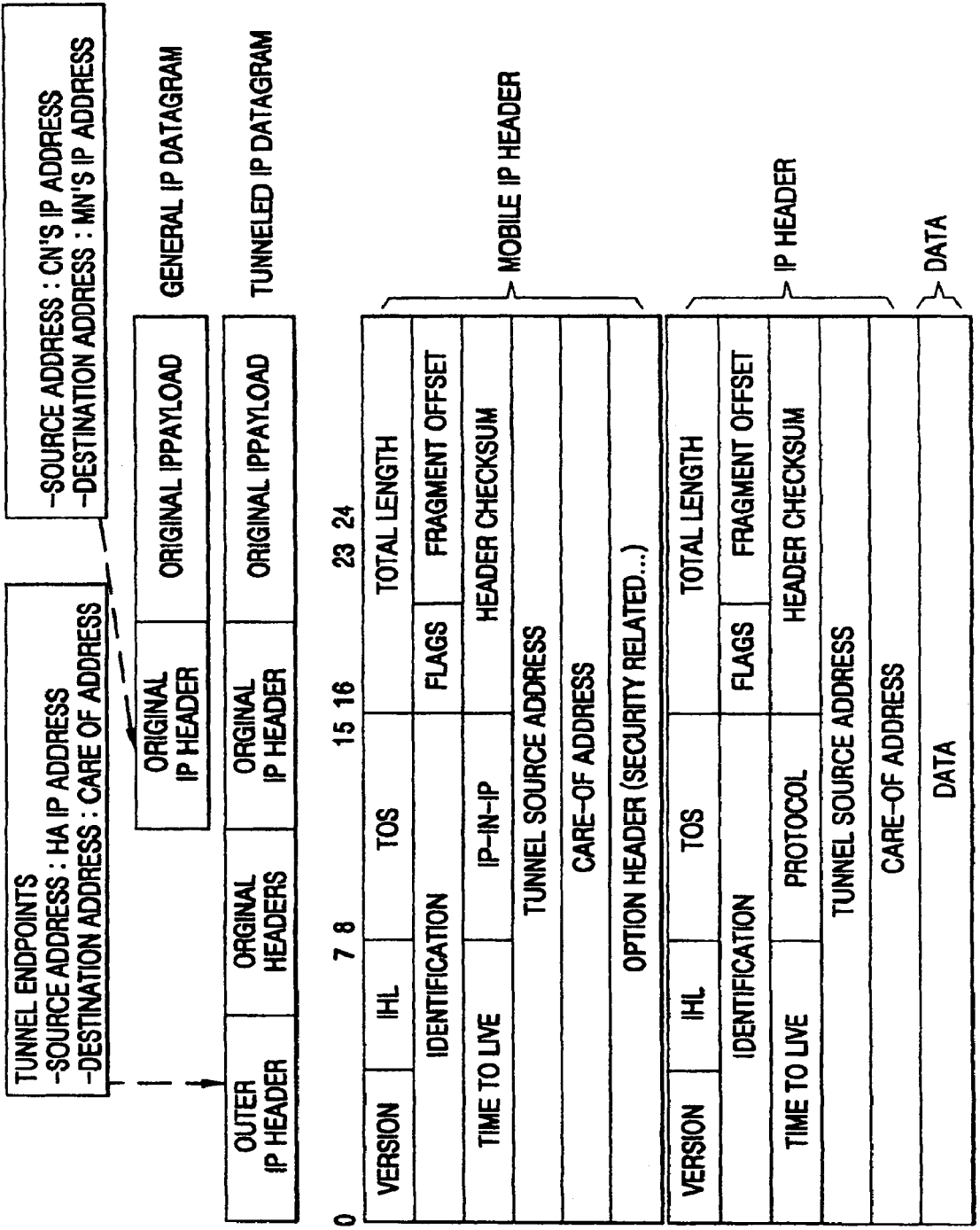
FIG. 2 is an IP datagram when providing a mobile IP using IP tunneling technology under an IPv4 address environment.

FIG. 2 is an IP datagram in a case of providing a mobile IP using IP tunneling technology under an IPv4 address environment.

When a correspondent node transmits an IP datagram of which the destination is a mobile node, the IP datagram is transmitted to a home network of the mobile node.

At this time, an agent (router) of the home network has to transmit the IP datagram to a foreign network where the mobile node is currently positioned and, hence, the agent will be unable to transmit the IP datagram, transmitted by intermediate routers, to the mobile node.

Thus, the agent of the home network, as shown in FIG. 2, has only to add (or, encapsulate) an IP header to one IP datagram and transmit the resultant datagram.

At this time, a protocol field of the mobile IP is set to IP-in-IP to indicate that the IP header and data are present in a data (payload) portion.

As described above, in the tunneling technology that supports mobility of a wireless LAN terminal up to now, a mobile IP header is added to an IP frame, resulting in an overhead problem.

In connection therewith, the Internet Engineering Task Force (IETF) has proposed a mobile IP protocol under the following background.

Although user's demand for mobility is increasingly higher as a notebook computer becomes smaller and of higher performance and wireless access technology is improved, movement of a host into another network does not allow the host to access the Internet since a current Internet protocol service is accomplished on the assumption that a position of the host accessing the Internet remains fixed.

At this time, the user has to suffer much inconvenience in managing an IP address because the user obtains a temporally usable IP address to correct its system setup from a network manager or the user changes system setup so that a dynamic host configuration protocol (DHCP) server is utilized.

To solve this problem, the Internet Engineering Task Force (IETF) has proposed a protocol called a mobile IP. In a network where hosts using such a protocol exist, the mobile host is allowed to use an Internet service without changing an IP address given from the home network.

Further, since a system supporting such IP mobility is not affected by the properties of network devices, an Internet service is possible by using wireless communication even when the mobile is moving. Therefore, using a protocol such as the mobile IP permits an Internet service available using a unique IP of the mobile node even in other network links. In particular, the Internet network service is available to a system such as a notebook computer having wireless LAN card and Bluetooth technology mounted thereon regardless of time and place.

Further, the IETF has proposed an IPv6 as a protocol to substitute for the current IPv4. If the IPv6 standard is established, an IPv6 node at least does not have to perform tunneling for route optimization. Instead, it suffices to use an IPv6 routing header having a modified source routing option from the IPv4.

However, there is a problem that substitution of the IPv6 network is accompanied by substitution of terminals into IPv6 supportable terminals, and because most of current terminals are based upon the IPv4, all IPv4 nodes must be modified.

A problem that arises when a mobile node moves will be discussed prior to describing the configuration of the present invention.

Figure 3:
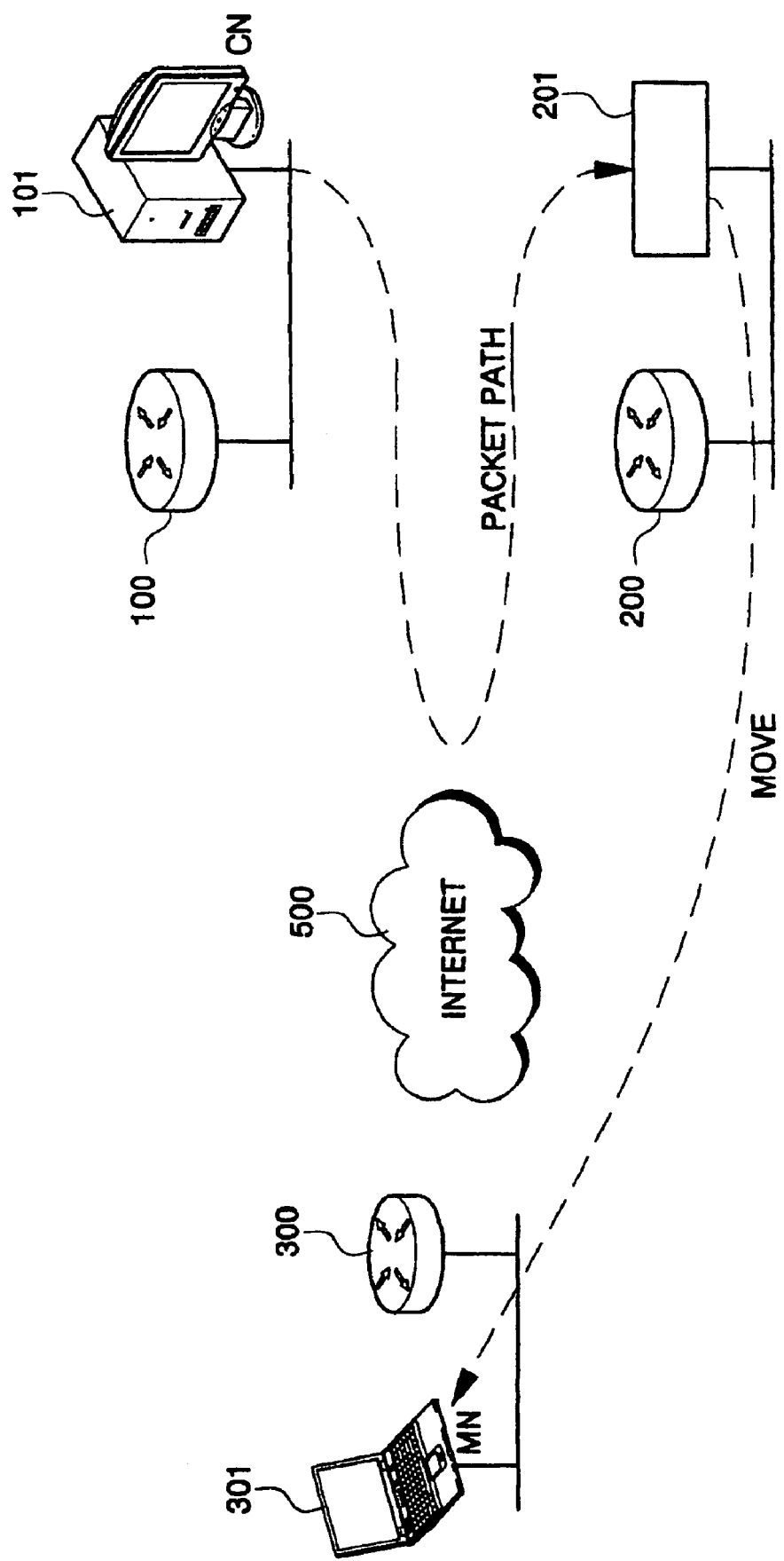
FIG. 3 is a state diagram showing a state when a mobile node has moved into another sub-network.

FIG. 3 is a state diagram showing a state where a mobile node has moved to another sub-network.

A data packet transmission state when a mobile node moves to another sub-network in a prior art will be described with reference to FIG. 3.

When a mobile node (MN) 301 moves from a node 201 before movement to an area of a foreign network, since a network prefix (e.g., 2.0.0.X/24) of an Internet protocol (IP) address allocated at the node 201 before movement is different from a network prefix (e.g., 3.0.0.x/24) of a foreign network router 300, a data packet is transmitted to a router 200 before movement according to a network prefix (2.0.0) of a destination IP address (e.g., 2.0.0.252/24) of a data packet transmitted by a correspondent node (CN) 101.

However, the data packet is discarded by the Internet control message protocol (ICMP) since the node corresponding to 2.0.0.252 has already moved to another place.

The ICMP is a protocol that controls a message between a host server and an Internet gateway and notifies errors. Here, since there is no node corresponding to a final destination IP address of the data packet, the ICMP recognizes it as an error and discards a relevant packet.

For reference, all hosts in one network share the same prefix.

Thus, in this case, in order to normally transmit a data packet to the mobile node 301, tunneling technology is used in which a header for a modified final destination IP address is added (or, encapsulated) to an initial IP frame.

In order not to use the tunneling technology, the present invention is intended to implement technology in which when a wireless LAN terminal (mobile node) moves, an IP address (an IP address having the same network prefix) suitable for a network into which the mobile node has moved is newly allocated.

Hereinafter, a system for supporting mobility of a wireless LAN terminal for implementing the present invention will be described with reference to FIG. 4.

Figure 4:
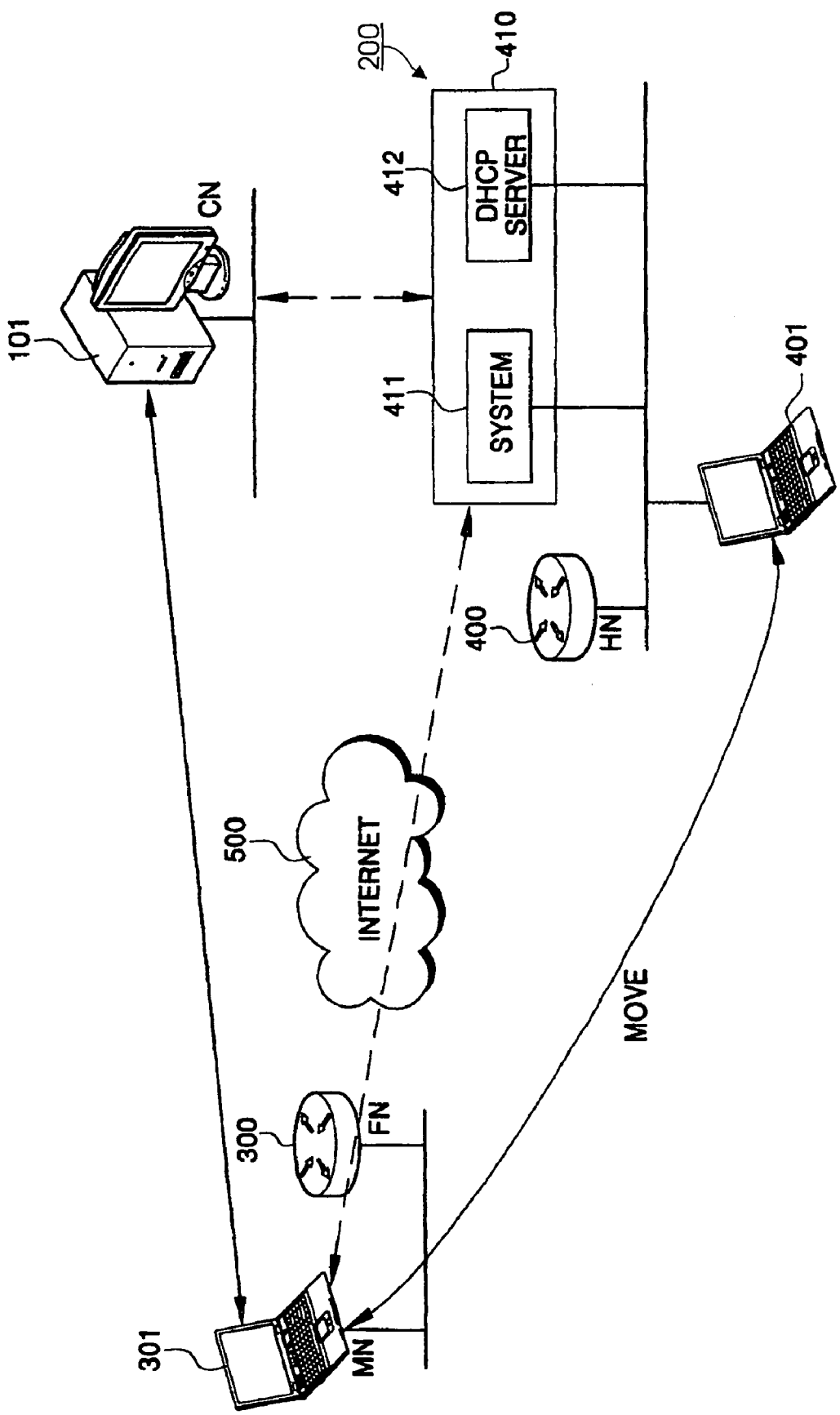
FIG. 4 is a schematic diagram illustrating a configuration to which a new IP allocating method is applied to implement the present invention.

FIG. 4 is a schematic diagram illustrating a configuration to which a new IP allocating method is applied to implement the present invention.

For reference, a mobile node before movement to another sub-network is recognized is denoted as wireless LAN terminal 401, and a wireless LAN terminal after moving into another sub-network is denoted as mobile node 301.

The configuration of a system for supporting mobility of a wireless LAN terminal is composed of a correspondent node (CN) 101 desiring to communicate with a mobile node, a home network (HN) 200 for managing an overall system, a router 400 for the home network 200, a wireless LAN terminal 401 having a wireless LAN card or a Bluetooth mounted thereon, a home network agent 410 for executing an entire operation for the home network 200, a mobile node 301 after the mobile node 401 has moved to a foreign network area, an foreign network router 300 to which the mobile node 301 belongs, and an Internet 500.

The home network agent 410 includes a home network system 411 for performing call management for the overall system, mobility sensing, initial registration of a mobile node, statistics, and database management; and a dynamic host configuration protocol (DHCP) server 412 for dynamically allocating an IP address.

The mobile node provides a wireless LAN interface for the sake of connection with a wireless LAN access point (AP), and uses a protocol (SIP: Session Initialization Protocol) providing a VoIP to an upper layer when the mobile node has a VoIP function.

The SIP is a protocol allowing for starting, modifying and terminating sessions of callers.

The router 400 in the home network 200 and the router 300 in the foreign network may include an access point (AP) that supports a wireless LAN connection.

Further, the configuration may be possible in which the routers 300 and 400 are interworked with the access point (AP).

In this configured situation, it is assumed that the mobile node 301 is allocated an IP address having the same network prefix as that of the foreign network router 300.

If the correspondent node 101 transmits a data packet to the mobile node 301, this data packet is directly transmitted to the foreign network router 300 via the Internet 500 rather than being transmitted to the node before movement since it is a situation that the mobile node 301 is allocated the IP address having the same network prefix as that of the foreign network router 300.

The foreign network router 300 transmits the data packet to the mobile node 301 as an IP address of the data packet indicates.

Thus, the data packet is transmitted to the mobile node 301 without separate overhead.

Meanwhile, a process of recognizing the movement of the mobile node will have to be performed first in order that the mobile node is allocated a new IP address.

The process of recognizing the movement of the mobile node is as follows:

The sub-networks in the present invention mean networks having the same ESSID (Extended Service Set Identification), and there exists at least one access point (AP) in one sub-network.

In order to see that the mobile node (MN) has moved into another sub-network, the mobile node scans neighboring networks through an active scan before the mobile node moves.

The scanning process will be described in more detail with reference to FIG. 5.

Figure 5:
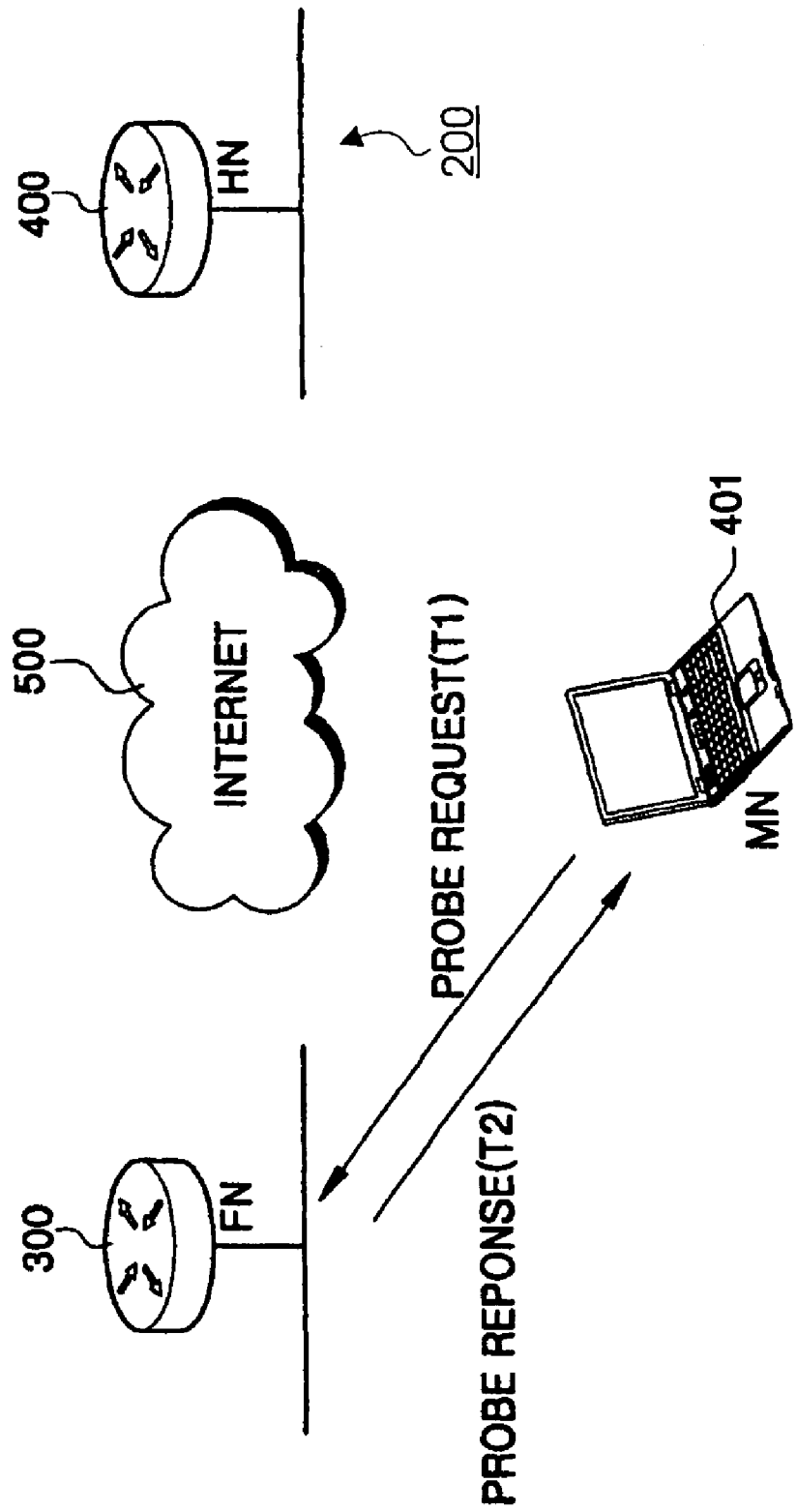
FIG. 5 is a conceptual diagram showing a process in which a mobile node discovers a network upon moving into another sub-network to implement the present invention.

FIG. 5 is a concept diagram showing a process in which a mobile node discovers a network upon moving into another sub-network to implement the present invention.

Figure 6:
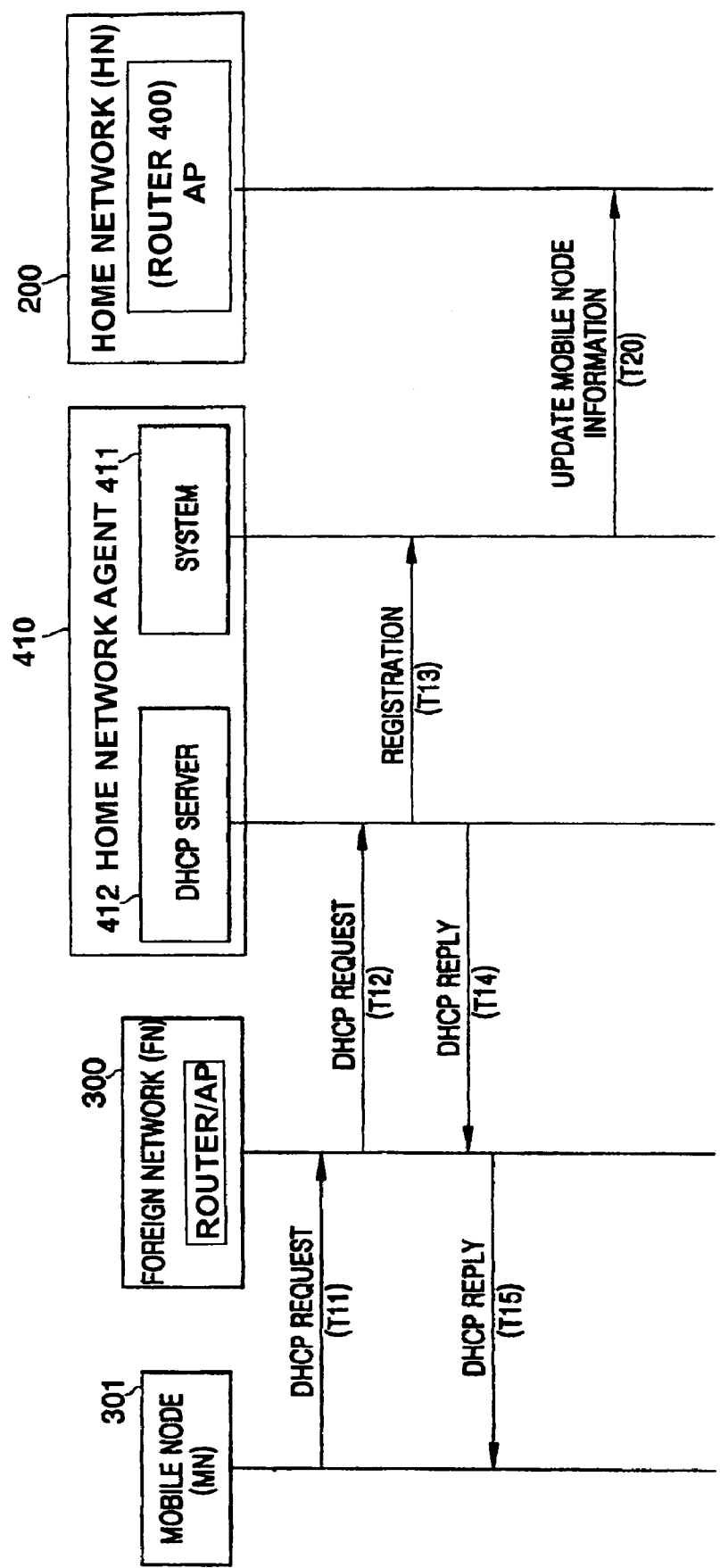
FIG. 6 is a flow diagram showing a relationship in which an IP address is allocated to a mobile node that has moved into another sub-network according to an embodiment of the present invention.

For reference, in FIG. 5, a mobile node before movement to another sub-network is recognized is denoted as wireless LAN terminal 401, and in FIG. 6, a wireless LAN terminal after moving into another sub-network is denoted as mobile node 301.

To carry out roaming from one access point (AP) to another access point (herein, it means to carry out communication associated switching from one access point to another access point), the mobile node 401 carries out operations (scanning) in which the mobile node 401 transmits a probe request message (T1), receives a probe response message (T2) and then discovers any access point to which the mobile node is allowed to subscribe.

A typical scan includes two types of scans at a default (setup state), namely, an active mode scan and a passive mode scan. The active mode scan is first carried out. Then, the scanning mode is switched to the passive mode scan and the passive mode scan is carried out if the access point is not discovered within a basic service set (BSS). When the access point is still not discovered, the active mode scan and the passive mode scan are repeatedly carried out.

In the scanning operation, all channels must be scanned so that connectable access points are discovered. The roaming is accomplished by the wireless LAN terminal transmitting an authentication request frame (a frame (IEEE802.11) to request that the wireless LAN terminal is subscribed to the access point) to an access point initially connected based upon the scan and, by the wireless terminal, receiving an authentication response frame to authenticate the wireless LAN terminal from the access point.

And, according to the above-described roaming system, the wireless LAN terminal is separated from the current access point, scans all connectable access points, and performs a subscription procedure to an access point having a maximum received signal strength indication (RSSI) (received electric field intensity) value.

At this time, it is required to determine whether an extended service set identification (ESSID) of the access point having the maximum RSSI value is the same as that of an access point in the home network 200 before the mobile node 401 moves.

If the two ESSIDs are the same, it means that the two access points belong to the same sub-network, while if the ESSIDs are different from each other, it means that the two access points belong to a different sub-network. Accordingly, if the two access points belong to a different sub-network, the network prefixes become different from each other and, at the network router, hence, the data packet is not delivered to the network into which the mobile node has moved and is filtered at the original call destination (home) network (before the wireless LAN terminal has moved), and is discarded by the Internet control message protocol (ICMP).

If movement of the mobile node to another sub-network is recognized through the above process, the mobile node has to request a DHCP server to allocate a new IP address to the mobile node.

A process in which a mobile node is assigned a new IP address from a DHCP server will be described with reference to FIG. 6.

FIG. 6 is a flow diagram showing a relationship in which an IP address is allocated to a node that has moved into another sub-network according to an embodiment of the present invention.

For reference, in FIG. 6, a wireless LAN terminal after moving into another sub-network is denoted as mobile node 301.

The mobile node 301 transmits a DHCP request frame to a foreign network router 300 of a foreign network into which the mobile node has moved, or an access point in the foreign network, (T11).

The foreign network router 300, or the access point in the foreign network to which the mobile node 301 now belongs, performs a DHCP relay to transmit the DHCP request frame to a DHCP server 412 included in a home network agent 410 managing the overall system (T12).

At this time, information on the mobile node 301 may be transmitted along with a MAC address, including authentication information such as a user ID and a password by using an option field of the message frame.

Meanwhile, although the present invention has been illustrated as performing the DHCP relay at a router or an access point belonging to each network, such a function may be performed by a hub, a bridge, or a switch.

Here, the DHCP server may be included in the home network agent 410. If the server is not provided by the home network agent, the DHCP server may be configured separately. If the DHCP server is configured separately, the home network agent provides an interface with the DHCP server.

The DHCP server 412 obtains information on the mobile node 301 (including a MAC address, a user ID, a password, and authentication information), and a MAC address of an access point (AP) from the DHCP request frame transmitted by the foreign network router 300 or the access point (AP) in the foreign network.

The DHCP server 412 allocates a new IP address suitable for a prefix of the foreign network router 300 of the mobile node 301 by using the obtained information, and transmits relevant information to the system 411 (T13).

At this time, the relevant information includes a MAC address of an AP where the mobile node is positioned, a MAC address of a mobile node, an IP address before a mobile node moves, a newly allocated IP address, a user ID, a password and authentication information.

Further, the DHCP server 412 transmits a DHCP reply message along with the newly allocated IP address to the foreign network router 300 or the foreign network access point, the DHCP reply message including an IP MAC address, a user ID, a password, and authentication information (T14).

The foreign network router 300 or the foreign network access point (AP) deletes the previous IP address from the information on the moving mobile node 301 in a table that stores information on the mobile nodes, updates the table with the newly allocated IP address, and transmits to the mobile node 301 a DHCP reply message for allocating the new IP address (T15).

Meanwhile, the system 411 requests an information update for the mobile node 301 to the router 400 or the access point (AP) in the home network (sub-network) 200 where the mobile node 301 was previously positioned by using the terminal information and MAC information received from the DHCP server 412 (T20).

Meanwhile, the mobile node (MN) means a wireless LAN terminal capable of taking a wireless LAN service in which a given wireless LAN card is mounted on an information terminal, such as a notebook computer, a Personal Digital Assistant (PDA), Personal Communication Services (PCS), etc., comprising a communication port such as a Personal Computer Memory Card International Association (PCMCIA) port, a Universal Serial Bus (USB) port, or a Peripheral Component Interconnect (PCI) slot or an Extended Industry Standard Architecture (EISA) slot.

Although the exemplary embodiments of the present invention have been described in detail, it will be appreciated by those skilled in the art that several variations or modifications may be made to the present invention without departing the technical spirit and scope of the present invention defined in the appended claims. Thus, future variations of the embodiments of the present invention will be unable to deviate from the technology of the present invention.

As described above, a new IP allocation scheme according to the present invention is capable of implementing route optimization having no overhead generation because direct communication is made between a mobile node and a correspondent node without passing a network where the mobile node existed before movement, as compared to a mobile IP providing scheme depending on an existing IP address system (IPv4), such as IP tunneling or the like, accompanied by generation of much packet overhead.

What is claimed is:

1. A method of supporting mobility of a mobile node using a mobile Internet protocol, the method comprising:

performing, by the mobile node, an active scan to thereby obtain an identifier of an access point that is determined to have high received electric field intensity;

comparing the obtained result with a previous identifier of an access point to thereby determine whether the mobile node has moved into another sub-network from a first sub-network;

when it is determined that the mobile node has moved into another sub-network, allocating by said first sub-network a new Internet protocol address to the mobile node, the Internet protocol address having a network prefix identical to that for the sub-network into which the mobile node has moved; and directly routing, by said first sub-network, a data packet to the another sub-network after movement using the Internet protocol address allocated in the previous step.

2. The method of claims 1, wherein the step of comparing includes:

determining whether the identifier of the access point that is determined to have the high received electric field intensity is identical to that of a previous access point to determine whether the another subnet is identical to a previous sub-network;

when the identifiers of the access points are different from each other, determining that the another sub-net is a different sub-network; and when the identifiers of the access points are identical to each other, determining that the another sub-net is the same sub-network.

3. The method of claim 2, wherein the mobile node manages registered access point identifiers of the access point identifiers obtained by the active scan.

4. The method of claim 2, wherein the mobile node is connected to an access point having the greatest received electric field intensity level value among access points having a registered identifier.

5. The method of claim 1, wherein the identifiers of the access points are extended service set identifications representing identifiers of the sub-networks.

6. The method of claim 5, wherein when the access points belong to the same sub-network, the extended service set identifications are the same.

7. The method of claim 1, wherein the active scan is performed when a level of received electric field intensity is lowered by a certain value upon movement of the mobile node.

8. The method of claim 1, wherein the active scan is periodically performed to confirm whether there are neighboring access points using any identifier.

9. The method of claim 1, wherein the mobile node is any one of a terminal with a wireless LAN (local area network) card mounted thereon and a terminal with bluetooth software mounted thereon.

10. The method of claim 1, wherein allocating the Internet protocol address to the mobile node, the Internet protocol address having the same network prefix as that after the movement, includes:

transmitting, by the mobile node, a dynamic host configuration protocol request frame to a dynamic host configuration protocol server upon connecting to an access point having an identifier different from an existing identifier; and transmitting, by the dynamic host configuration protocol server, a response frame to the mobile node in response to the dynamic host configuration protocol request frame.

11. The method of claim 10, wherein upon transmitting the dynamic host configuration protocol request frame to the dynamic host configuration protocol server, the mobile node transmits the frame including a user identifier, password and authentication information in an option field of the frame.

12. The method of claim 10, wherein the access point performs a dynamic host configuration protocol relay function with a predefined dynamic host configuration protocol server, and transmits information obtained from the mobile node and access point media access control address information included in an option field to the dynamic host configuration protocol server.

13. The method of claim 12, wherein the access point performs the dynamic host configuration protocol relay function with the dynamic host configuration protocol server using one of a router, a hub, a bridge, and a switch.

14. The method of claim 10, the dynamic host configuration protocol server allocates an Internet protocol address of the mobile node using the received mobile node information and access point information, and transmits the newly allocated Internet protocol address to the access point.

15. The method of claim 10, wherein the dynamic host configuration protocol server transmits mobile node information to a home network managing an overall system.

16. The method of claim 1, comprising:

when there is a correspondent mobile node in communication with the mobile node that has moved into the another sub-network, directly routing a data packet to the sub-network into which the mobile node has moved by transmitting new Internet protocol address information of the moving mobile node to correspondent mobile node.

17. The method of claim 16, wherein a home network notifies the access point where the moving mobile node was previously positioned of an Internet protocol address change of the mobile node.

18. The method of claim 16, wherein the access point where the moving mobile node was previously positioned retransmits authentication information of the moving mobile node and data packets received during the movement to a new destination Internet protocol address.

19. A system for supporting mobility of mobile terminals in a system, comprising:

a home network agent allocating to a mobile node a new Internet protocol address having a network prefix identical to that for a sub-network into which said mobile node has moved, when an active scan is performed by the mobile node to thereby obtain an identifier of an access point that is determined to have high received electric field intensity, and a previous identifier is compared with the obtained result to thereby recognize that the mobile node has moved into another sub-network, the access points having identifiers identical to each other when the access points belong to the same sub-network; and the home network agent directly routing a data packet to the another sub-network after movement by using the Internet protocol address allocated by the home network agent.

20. The system of claim 19, wherein the home network agent further comprises a dynamic host configuration protocol server, the server performing call management of an overall system, mobility sensing, initial registration of mobile nodes, statistics, database management, and allocation of the new Internet protocol address to the mobile node.

21. The system of claim 20, wherein upon moving into the another sub-network, the mobile node is allocated an Internet protocol address suitable for a network prefix after the movement from the dynamic host configuration protocol server.

22. The system of claim 20, the mobile node transmitting a dynamic host configuration protocol request frame to the dynamic host configuration protocol server, the request frame including a user identifier, password and authentication information in an option field of the frame.

23. The system of claim 20, wherein the access point performs a dynamic host configuration protocol relay function with a predefined dynamic host configuration protocol server, and transmits information obtained from the mobile node and access point media access control address information included in an option field to the dynamic host configuration protocol server of the home network agent.

24. The system of claim 23, wherein the access point performs the dynamic host configuration protocol relay function with the dynamic host configuration protocol server using one of a router, a hub, a bridge, and a switch.

25. The system of claim 20, the dynamic host configuration protocol server allocating the new Internet protocol address to the mobile node using received mobile node information and access point information, and transmitting the newly allocated Internet protocol address to the access point.

26. The system of claim 25, wherein the dynamic host configuration protocol server transmits the mobile node information to the home network managing the overall system.

27. The system of claim 19, wherein the identifiers of the access points are extended service set identifications representing identifiers of the sub-networks.

28. The system of claim 19, wherein the mobile node manages registered access point identifiers of access point identifiers obtained through an active scan.

29. The system claim 19, wherein the mobile node is connected to an access point having the greatest received electric field intensity level value among access points having a registered identifier.

30. The system of claim 19, wherein the home network notifies the access point where the moving mobile node was previously positioned of an Internet protocol address change of the mobile node.

31. The system of claim 19, wherein the access point where the moving mobile node was previously positioned retransmits authentication information of the moving mobile node and data packets received during the movement to a new destination Internet protocol address.

32. The system of claim 19, wherein the mobile node is any one of a terminal having a wireless LAN (local area network) card mounted thereon and a terminal having a bluetooth mounted thereon.

\* \* \* \* \*